(12) United States Patent
Morimoto et al.

(10) Patent No.: US 8,428,641 B2
(45) Date of Patent: Apr. 23, 2013

(54) TRANSMISSION POWER CONTROL METHOD, MOBILE COMMUNICATION SYSTEM AND RADIO BASE STATION

(75) Inventors: Akihito Morimoto, Yokohama (JP);
Yoshihisa Kishiyama, Yokosuka (JP);
Motohiro Tanno, Yokohama (JP);
Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 97 days.

(21) Appl. No.: 13/120,387

(22) PCT Filed: Sep. 17, 2009

(86) PCT No.: PCT/JP2009/066224
§ 371 (c)(1),
(2), (4) Date: May 24, 2011

(87) PCT Pub. No.: WO2010/032774
PCT Pub. Date: Mar. 25, 2010

(65) Prior Publication Data
US 2011/0218015 A1    Sep. 8, 2011

(30) Foreign Application Priority Data
Sep. 22, 2008   (JP) ................. P2008-242658

(51) Int. Cl.
*H04B 7/00* (2006.01)
(52) U.S. Cl.
USPC ................... 455/522; 455/561; 370/328
(58) Field of Classification Search .......... 455/442–444, 455/522, 524, 550.1, 561; 370/328
See application file for complete search history.

(56) References Cited

U.S. PATENT DOCUMENTS

| | | | |
|---|---|---|---|
| 6,070,084 A * | 5/2000 | Hamabe | 455/522 |
| 6,950,671 B2 * | 9/2005 | Hamabe | 455/522 |
| 7,190,964 B2 * | 3/2007 | Damnjanovic et al. | 455/522 |
| 7,366,130 B2 * | 4/2008 | Qiu et al. | 370/328 |
| 8,340,679 B1 * | 12/2012 | Vargantwar et al. | 455/452.2 |
| 2003/0171118 A1 | 9/2003 | Miya | |

FOREIGN PATENT DOCUMENTS

| | | |
|---|---|---|
| EP | 1 802 161 A1 | 6/2007 |
| JP | 2005-184099 A | 7/2005 |
| JP | 2007-060177 A | 3/2007 |
| JP | 2008-086032 A | 4/2008 |

(Continued)

OTHER PUBLICATIONS

Office Action for Japanese Patent Application No. 2008-242658 mailed May 8, 2012, with English translation thereof (5 pages).

(Continued)

*Primary Examiner* — Nhan Le
(74) *Attorney, Agent, or Firm* — Osha Liang LLP

(57) ABSTRACT

A transmission power control is disclosed, where the transmission power control includes transferring, from a second radio base station to a first radio base station, a second uplink signal received from a mobile station in a second cell, synthesizing, at the first radio base station, a first uplink signal received from the mobile station in a first cell with the second uplink signal transferred from the second radio base station, and generating and transmitting a transmission power control signal for controlling a transmission power of an uplink signal at the mobile station based on a reception quality of an uplink signal obtained by synthesizing the first uplink signal with the second uplink signal.

9 Claims, 6 Drawing Sheets

FOREIGN PATENT DOCUMENTS

| | | |
|---|---|---|
| JP | 2008-533924 A | 8/2008 |
| WO | 02/102109 A1 | 12/2002 |
| WO | 2006/099548 A1 | 9/2006 |

OTHER PUBLICATIONS

NTT DoCoMo, Inc., "Inter-cell Radio Resource Management for Heterogeneous Network," 3GPP TSG RAN WG1 Meeting #54, R1-083019, Aug. 18, 2008, 20 pages.

NTT DoCoMo, Inc., "Proposals for LTE-Advanced Technologies," 3GPP TSG RAN IMT Advanced Workshop, REV-080026, Apr. 7, 2008, 18 pages.

International Search Report issued in PCT/JP2009/066224, mailed on Dec. 22, 2009, with translation, 5 pages.

Written Opinion issued in PCT/JP2009/066224, mailed on Dec. 22, 2009, 4 pages.

\* cited by examiner

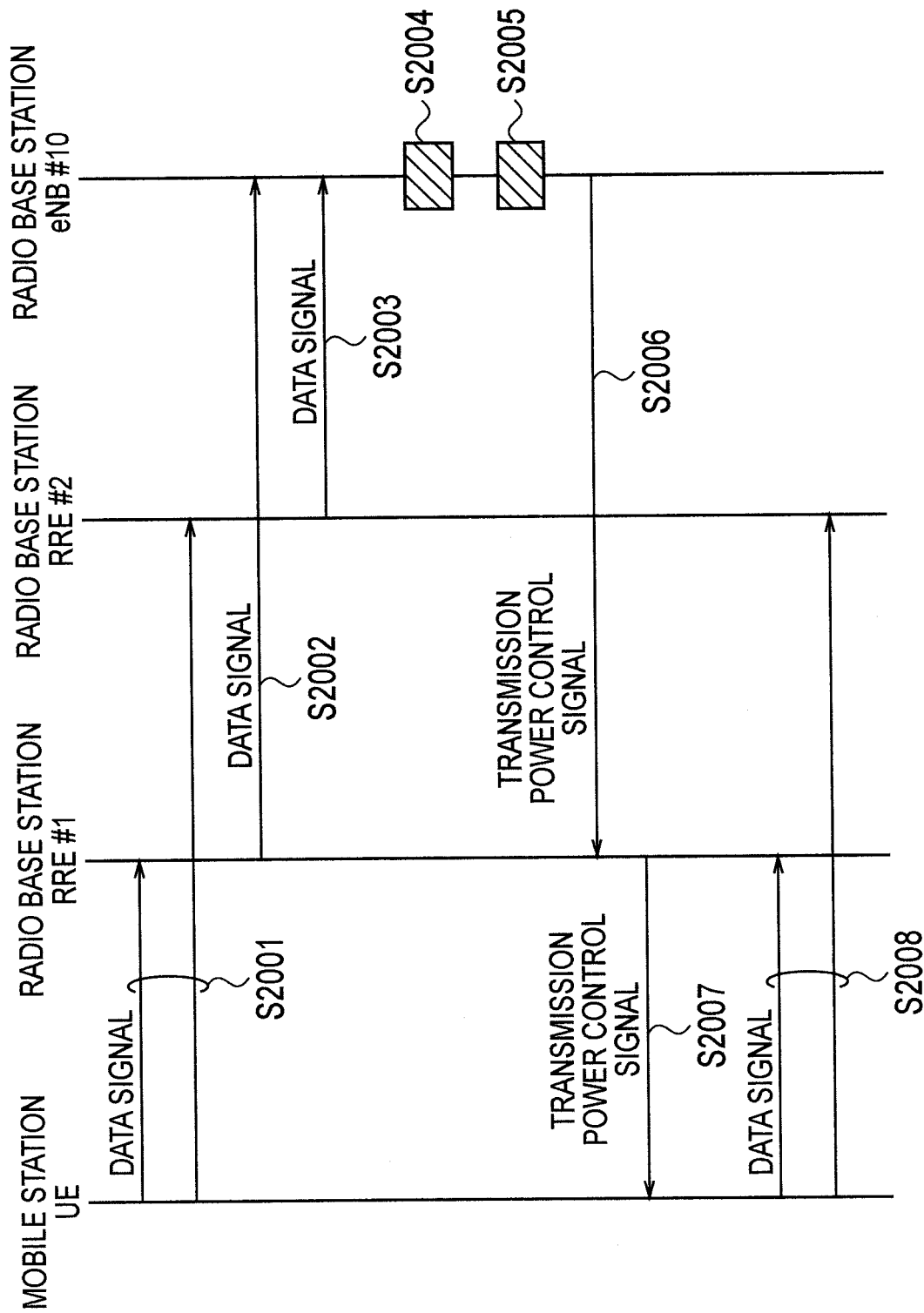

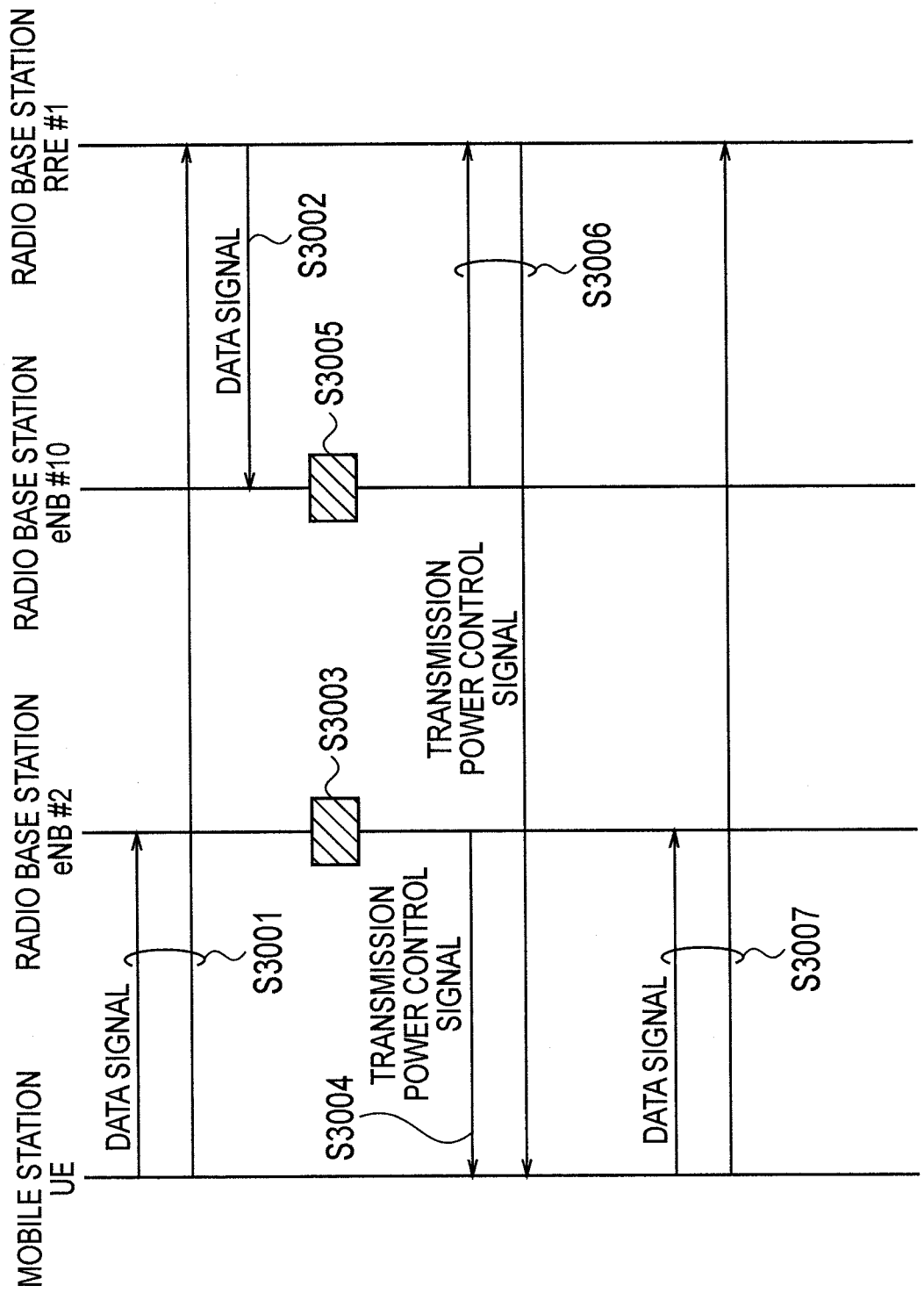

TRANSMISSION POWER CONTROL METHOD, MOBILE COMMUNICATION SYSTEM AND RADIO BASE STATION

TECHNICAL FIELD

The present invention relates to a transmission power control method, a mobile communication system, and a radio base station.

BACKGROUND ART

In recent years, there has been studied a mobile communication system in which an autonomous distributed network in which each radio base station eNB autonomously performs a control operation and a centralized control network in which a specific radio base station eNB controls radio base stations RRE are mixed.

SUMMARY OF THE INVENTION

Problems to be Solved by the Invention

However, the above-described mobile communication system is problematic in that there is no prescription regarding how to appropriately control the transmission power of uplink signals at a mobile station in a soft handover state in each of the autonomous distributed network and the centralized control network.

Therefore, the present invention is intended to overcome the above-described problem. An object of the present invention is to provide a transmission power control method, a mobile communication system, and a radio base station capable of appropriately controlling the transmission power of uplink signals at a mobile station in a soft handover state in an environment in which an autonomous distributed network and a centralized control network are mixed.

Means for Solving the Problem

A first aspect of the present invention is summarized as a transmission power control method of controlling transmission power of an uplink signal at a mobile station setting a radio link with a first cell under the control of a first radio base station and with a second cell under the control of a second radio base station, the method including the steps of: (A) transferring, from the second radio base station to the first radio base station, a second uplink signal received from the mobile station in the second cell; (B) synthesizing, at the first radio base station, a first uplink signal received from the mobile station in the first cell with the second uplink signal transferred from the second radio base station, generating and transmitting a transmission power control signal for controlling the transmission power of the uplink signal at the mobile station based on a reception quality of an uplink signal obtained by synthesizing the first uplink signal with the second uplink signal; and (C) controlling, at the mobile station, the transmission power of the uplink signal based on the received transmission power control signal.

In the first aspect of the present invention, in the step (A), the second radio base station can transfer, to the first radio base station, the second uplink signal as a signal of a layer 1; and in the step (B), the first radio base station can synthesize the first uplink signal with the second uplink signal by a maximum ratio combining.

In the first aspect of the present invention, in the step (A), the second radio base station can transfer, to the first radio base station, the second uplink signal as a signal of a layer 2 or a signal of a layer 3; and in the step (B), the first radio base station can synthesize the first uplink signal with the second uplink signal by a selection combining.

A second aspect of the present invention is summarized as a mobile communication system configured to control transmission power of an uplink signal at a mobile station setting a radio link with a first cell under the control of a first radio base station and with a second cell under the control of a second radio base station; wherein the second radio base station is configured to transfer, to the first radio base station, a second uplink signal received from the mobile station in the second cell; the first radio base station is configured to synthesize a first uplink signal received from the mobile station in the first cell with the second uplink signal transferred from the second radio base station, and to generate and transmit a transmission power control signal for controlling the transmission power of the uplink signal at the mobile station based on a reception quality of an uplink signal obtained by synthesizing the first uplink signal with the second uplink signal; and the mobile station is configured to control the transmission power of the uplink signal based on the received transmission power control signal.

In the second aspect of the present invention, the second radio base station can be configured to transfer, to the first radio base station, the second uplink signal as a signal of a layer 1; and the first radio base station can be configured to synthesize the first uplink signal with the second uplink signal by a maximum ratio combining.

In the second aspect of the present invention, the second radio base station can be configured to transfer, to the first radio base station, the second uplink signal as a signal of a layer 2 or a signal of a layer 3; and the first radio base station can be configured to synthesize the first uplink signal with the second uplink signal by a selection combining.

A third aspect of the present invention is summarized as a radio base station serving as a first radio station in a mobile communication system configured to control transmission power of an uplink signal at a mobile station setting a radio link with a first cell under the control of the first radio base station and with a second e cell under the control of a second radio base station, the radio base station including: a synthesis unit configured to synthesize a first uplink signal received from the mobile station in the first cell with a second uplink signal transferred from the second radio base station and received from the mobile station in the second cell; and a transmission unit configured to generate and transmit a transmission power control signal for controlling the transmission power of the uplink signal at the mobile station based on a reception quality of an uplink signal obtained by synthesizing the first uplink signal with the second uplink signal.

In the third aspect of the present invention, the synthesis unit can be configured to synthesize the first uplink signal with the second uplink signal by a maximum ratio combining, when the second uplink signal is received from the second radio base station as a signal of a layer 1.

In the third aspect of the present invention, the synthesis unit can be configured to synthesize the first uplink signal with the second uplink signal by a selection combining, when the second uplink signal is received from the second radio base station as a signal of a layer 2 or a signal of a layer 3.

A fourth aspect of the present invention is summarized as a mobile communication system including: a first radio base station managing a first cell; a second radio base station managing a second cell; a third radio base station managing a third cell; a fourth radio base station managing a fourth cell; and a fifth radio base station managing a fifth cell, wherein the first radio base station and the second radio base station are connected to an autonomous distributed control network; the third radio base station and the fourth radio base station are connected to a centralized control network controlled by the fifth radio base station; when a mobile station establishes a radio link with the first radio base station and with the second radio base station, the first radio base station is configured to generate and transmit a transmission power control signal for controlling transmission power of an uplink signal at the mobile station based on a reception quality of a first uplink signal received from the mobile station in the first cell, and the second radio base station is configured to generate and transmit a transmission power control signal for controlling transmission power of an uplink signal at the mobile station based on a reception quality of a second uplink signal received from the mobile station in the second cell; and when the mobile station establishes a radio link with the third radio base station and with the fourth radio base station, the third radio base station and the fourth radio base station are configured to transmit a third uplink signal and a fourth uplink signal received from the mobile station in the third cell and the fourth cell to the fifth radio base station, and the fifth radio base station is configured to synthesize the third uplink signal with the fourth uplink signal, to generate a transmission power control signal for controlling the transmission power of the uplink signal at the mobile station based on a reception quality of an uplink signal obtained by synthesizing the third uplink signal with the fourth uplink signal, and to transmit the transmission power control signal via the third radio base station or the fourth radio base station.

In the fourth aspect of the present invention, when the mobile station establishes a radio link with the first radio base station and with the third radio base station, the first radio base station is configured to generate and transmit a transmission power control signal for controlling the transmission power of the uplink signal at the mobile station based on the first uplink signal; the third radio base station is configured to transfer the third uplink signal to the fifth radio base station; and the fifth radio base station is configured to generate a transmission power control signal for controlling the transmission power of the uplink signal at the mobile station based on a reception quality of the third uplink signal, and to transmit the transmission power control signal via the third radio base station.

Effect of the Invention

According to the invention as described above, it is possible to provide a transmission power control method, a mobile communication system, and a radio base station capable of appropriately controlling the transmission power of uplink signals at a mobile station in a soft handover state in an environment in which an autonomous distributed network and a centralized control network are mixed.

BRIEF DESCRIPTION OF THE DRAWINGS

FIG. 7 is a sequence chart showing an operation of the mobile communication system according to the first modification of the present invention.

FIG. 8 is a sequence chart showing the operation of the mobile communication system according to the first modification of the present invention.

BEST MODES FOR CARRYING OUT THE INVENTION (Configuration of Mobile Communication System According to First Embodiment of the Present Invention)

Figure 1:
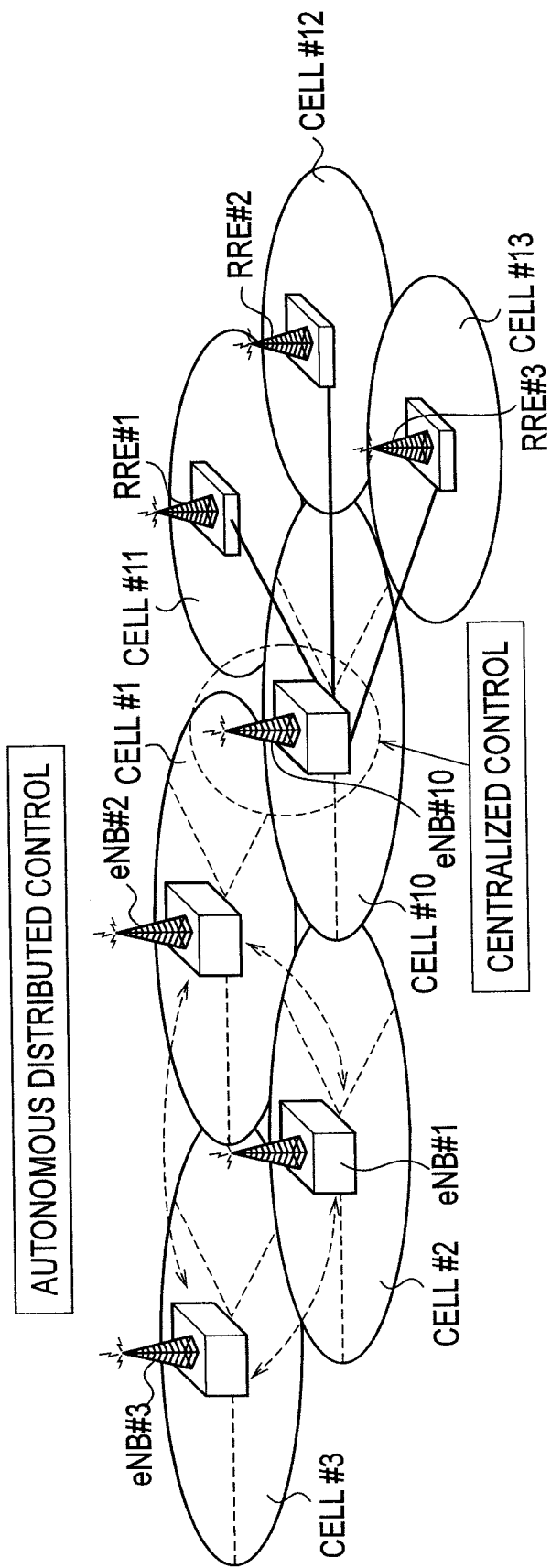
FIG. 1 is a diagram showing the entire configuration of a mobile communication system according to a first embodiment of the present invention.
Figure 2:
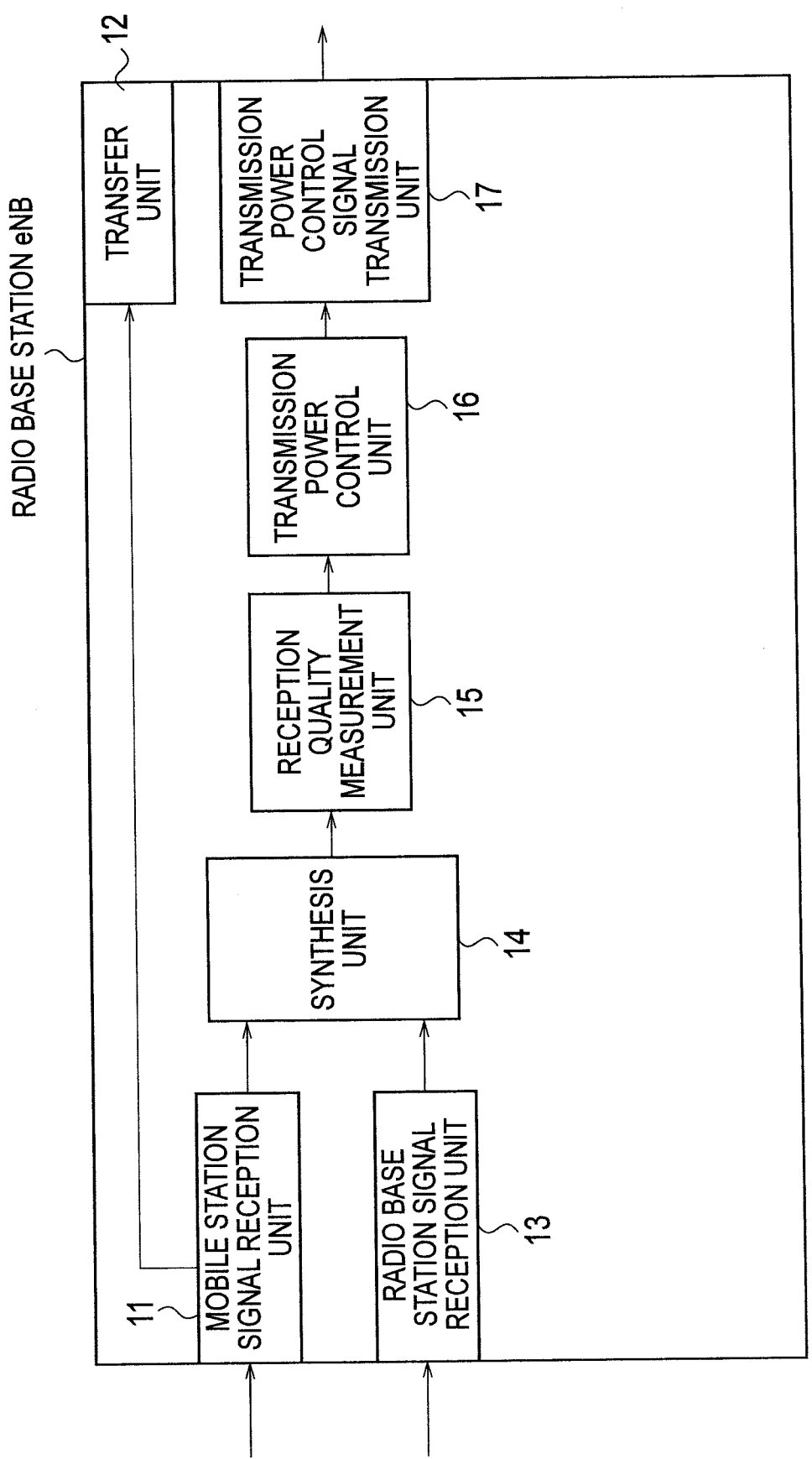
FIG. 2 is a functional block diagram of a radio base station eNB according to the first embodiment of the present invention.
Figure 3:
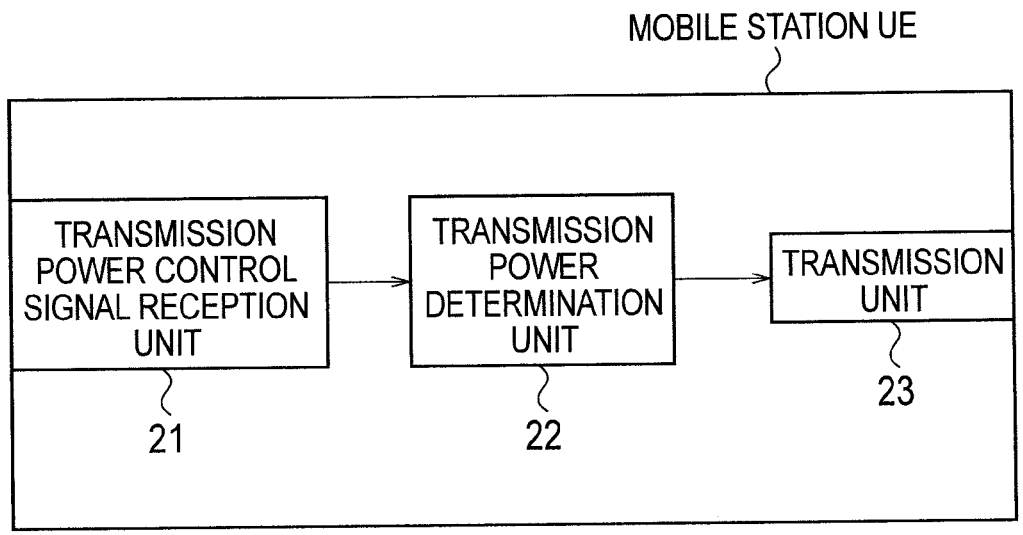
FIG. 3 is a functional block diagram of a mobile station UE according to the first embodiment of the present invention.

With reference to FIG. 1 to FIG. 3, the configuration of a mobile communication system according to a first embodiment of the present invention will be explained.

As shown in FIG. 1, in the mobile communication system according to the embodiment, an autonomous distributed control network and a centralized control network are mixed, and a radio access technology such as the LTE (Long Term Evolution) scheme is employed.

In the autonomous distributed control network, radio base stations eNB #1 to eNB #3 are configured to be connected to each other and exchange control signals therebetween, thereby autonomously controlling radio communication in cells under the control of the radio base stations eNB #1 to eNB #3.

Here, the radio base stations eNB #1 to eNB #3 may be directly connected to each other via high-rate radio transmission paths or wired transmission paths or may be indirectly connected via a core network.

On the other hand, in the centralized control network, a radio base stations eNB #10 is configured to be connected to RRE (Remote Radio Equipment) #1 to RRE #3 and control radio communication in the cells under the control of f the radio base stations RRE #1 to RRE #3.

Here, the radio base stations RRE #1 to RRE #3 are directly connected to the radio base stations eNB #10 via high-rate radio transmission paths and wired transmission paths.

In both the autonomous distributed control network and the centralized control network, the same frequency is repeatedly used for a plurality of cells.

A mobile station UE is configured to establish a radio link with one cell or with a plurality of cells in the autonomous distributed control network and the centralized control network.

As shown in FIG. 2, each of the radio base stations eNB #1 to eNB #3 (hereinafter, referred to as radio base stations eNB) in the autonomous distributed control network includes a mobile station signal reception unit 11, a transfer unit 12, a radio base station signal reception unit 13, a synthesis unit 14, a reception quality measurement unit 15, a transmission power control unit 16, and a transmission power control signal transmission unit 17.

The mobile station signal reception unit 11 is configured to receive an uplink signal (for example, a control signal or a data signal) transmitted from the mobile station UE establishing a radio link with the cell under the control of the radio base station eNB.

When the cell under the control of the radio base station eNB is not a serving cell of the mobile station UE, the transfer unit 12 is configured to transfer an uplink signal (a second uplink signal) to another radio base station managing the serving cell of the mobile station UE.

The radio base station signal reception unit 13 is configured to receive a signal (for example, an uplink signal from the mobile station UE received in the cell under the control of another radio base station) transferred from another radio base station.

When the above-described cell under the control of the radio base station eNB is the serving cell of the above-described mobile station UE, the synthesis unit 14 synthesizes the uplink signal (a first uplink signal) received from the mobile station UE in the cell under the control of the radio base station eNB and the second uplink signal transferred from another radio base station described above.

Here, when receiving the second uplink signal from another radio base station described above as a signal of a layer 1, the synthesis unit 14 may synthesize the first uplink signal with the second uplink signal by the maximum ratio combining (MRC).

In addition, when receiving the second uplink signal from another radio base station described above as a signal of a layer 2 or a signal of a layer 3, the synthesis unit 14 may synthesize the first uplink signal with the second uplink signal by the selection combining.

The reception quality measurement unit 15 is configured to measure the reception quality of an uplink signal obtained by the synthesis unit 14. Examples of the reception quality include RSRQ (Reference Signal Received Quality), RSRP (Reference Signal Received Power), received SIR (Signal to Interference Ratio) and the like.

The transmission power control unit 16 is configured to generate a transmission power control signal for controlling the transmission power of the uplink signal at the mobile station UE, based on the reception quality measured by the reception quality measurement unit 15.

For example, the transmission power control unit 16 generates a TPC (Transmission Power Control) command as the transmission power control signal, so that the reception quality measured by the reception quality measurement unit 15 becomes closer to a target value.

The transmission power control signal transmission unit 17 is configured to transmit the transmission power control signal generated by the transmission power control unit 16, to the mobile station UE.

As shown in FIG. 3, the mobile station UE includes a transmission power control signal reception unit 21, a transmission power determination unit 22, and a transmission unit 23.

The transmission power control signal reception unit 21 is configured to receive the transmission power control signal from the above-described radio base station eNB, that is, the radio base station eNB managing the serving cell of the mobile station UE or each radio base station eNB managing each cell in which the mobile station UE establishes a radio link.

The transmission power determination unit 22 is configured to determine the transmission power of the uplink signal, based on the transmission power control signal received by the transmission power control signal reception unit 21.

The transmission unit 23 is configured to transmit the uplink signal based on the transmission power determined by the transmission power determination unit 22.

(Operation of the Mobile Communication System According to the First Embodiment of the Present Invention)

Figure 4:
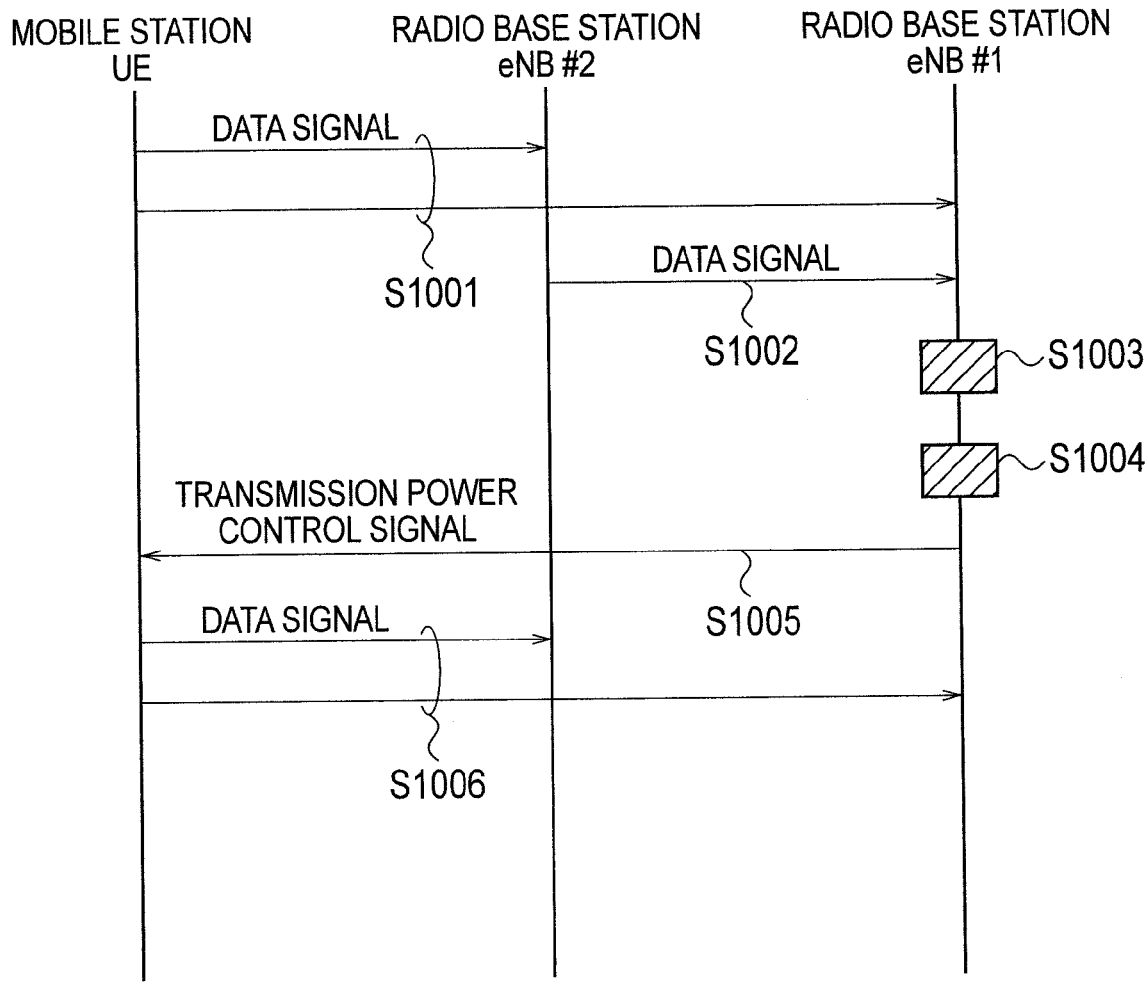
FIG. 4 is a sequence chart showing an operation of the mobile communication system according to the first embodiment of the present invention.

With reference to FIG. 4, the operation of the mobile communication system according to the first embodiment of the present invention will be explained.

As shown in FIG. 4, in step S1001, the mobile station UE, which establishes a radio link with a cell #1 under the control of the radio base station eNB #1 and with a cell #2 under the control of the radio base station eNB #2, transmits a data signal as an uplink signal. Here, it is assumed that the cell #1 is the serving cell of the mobile station UE.

In step S1002, the radio base station eNB #2 transfers, to the radio base station eNB #1, the data signal from the mobile station UE received in the cell #2.

In step S1003, the radio base station eNB #1 synthesizes the data signal (the first uplink signal) received from the mobile station UE in the cell #1 with the data signal (the second uplink signal) transferred from the radio base station eNB #2.

In step S1004, the radio base station eNB #1 generates a transmission power control signal for controlling the transmission power of the uplink signal at the mobile station UE, based on the reception quality of a data signal (an uplink signal) obtained by the synthesis.

In step S1005, the radio base station eNB#1 transmits the transmission power control signal to the mobile station UE.

In step S1006, the mobile station UE controls the transmission power of the uplink signal, based on the received transmission power control signal.

(Operation and Effect of the Mobile Communication System According to the First Embodiment of the Present Invention)

In the mobile communication system according to the embodiment, the radio base station eNB #1 managing the serving cell of the mobile station UE controls the transmission power of the uplink signal at the mobile station UE in the autonomous distributed control network, thereby achieving high speed control as compared with a case where a high-level node (for example, a radio control apparatus RNC, a mobile switching center MME and the like) of the radio base station eNB #1 controls the transmission power of the uplink signal at the mobile station UE.

(First Modification)

Hereinafter, the mobile communication system according to a first modification of the invention will be described while focusing on the difference relative to the mobile communication system according to the first embodiment with reference to FIGS. 5 to 7.

Figure 5:
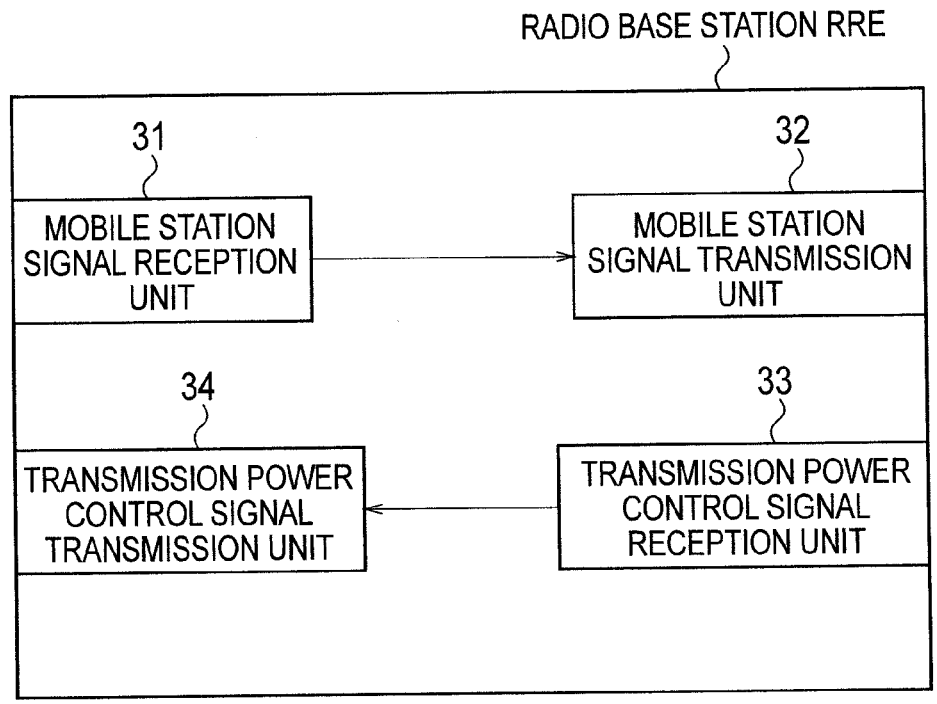
FIG. 5 is a functional block diagram of a radio base station RRE according to a first modification of the present invention.

As shown in FIG. 5, in the first modification, the radio base station RRE in the centralized control network includes a mobile station signal reception unit 31, a mobile station signal transmission unit 32, a transmission power control signal reception unit 33, and a transmission power control signal transmission unit 34.

The mobile station signal reception unit 31 is configured to receive an uplink signal (for example, a control signal or a data signal) transmitted from the mobile station UE establishing a radio link with cells under the control of the radio base station RRE.

The mobile station signal transmission unit 32 is configured to transmit the uplink signal received by the mobile station signal reception unit 31, to the radio base station eNB mainly controlling the centralized control network.

The transmission power control signal reception unit 33 is configured to receive the transmission power control signal for the mobile station UE, which is transmitted from the radio base station eNB mainly controlling the centralized control network.

The transmission power control signal transmission unit 34 is configured to transmit the transmission power control signal received by the transmission power control signal reception unit 33, to the mobile station UE.

Figure 6:
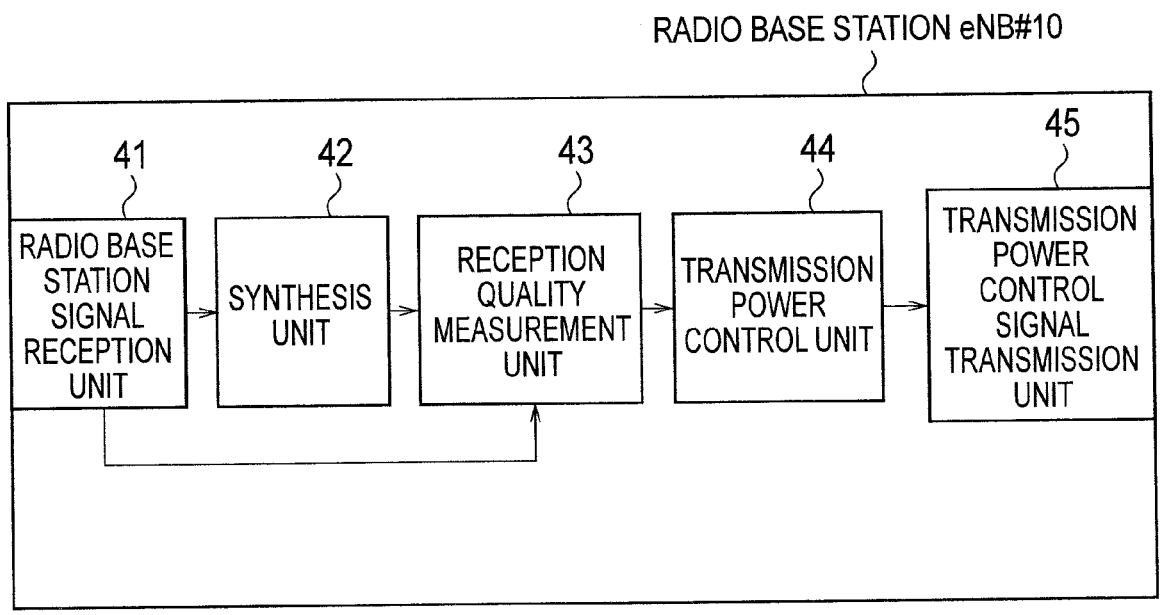
FIG. 6 is a functional block diagram of a radio base station eNB according to the first modification of the present invention.

As shown in FIG. 6, in the first modification, the radio base station eNB mainly controlling the centralized control network includes a radio base station signal reception unit 41, a synthesis unit 42, a reception quality measurement unit 43, a transmission power control unit 44, and a transmission power control signal transmission unit 45.

The radio base station signal reception unit 41 is configured to receive a plurality of signals (for example, uplink signals from the mobile station UE received in the cell under the control of each radio base station RRE) transferred from the radio base station RRE connected to the centralized control network.

The synthesis unit 42 is configured to synthesize the plurality of signals received by the radio base station signal reception unit 41.

The reception quality measurement unit 43 is configured to measure the reception quality of an uplink signal obtained by the synthesis unit 42. Examples of the reception quality include RSRQ (Reference Signal Received Quality), RSRP (Reference Signal Received Power), received SIR (Signal to Interference Ratio) and the like.

The transmission power control unit 44 is configured to generate a transmission power control signal for controlling the transmission power of the uplink signal at the mobile station UE, based on the reception quality measured by the reception quality measurement unit 43.

For example, the transmission power control unit 44 is configured to generate a TPC command as the transmission power control signal, so that the reception quality measured by the reception quality measurement unit 43 becomes closer to a target value.

The transmission power control signal transmission unit 45 is configured to transmit the transmission power control signal generated by the transmission power control unit 44, to the mobile station UE.

First, a first exemplary operation of the mobile communication system according to the first modification will be described with reference to FIG. 7. In the example of FIG. 7, it is assumed that the mobile station UE establishes a radio link with the cell #11 under the control of the radio base station RRE #1 and with the cell #12 under the control of the radio base station RRE #2 in a centralized control network.

As shown in FIG. 7, in step S2001, the mobile station UE transmits a data signal as an uplink signal.

In step S2002, the radio base station RRE #1 transfers the data signal from the mobile station UE received in the cell #11, to the radio base station eNB #10. In step S2003, the radio base station RRE #2 transfers the data signal from the mobile station UE received in the cell #12, to the radio base station eNB #10.

In step S2004, the radio base station eNB #10 synthesizes the data signal (the uplink signal) transferred from the radio base station RRE #1 with the data signal (the uplink signal) transferred from the radio base station RRE #2.

In step S2005, the radio base station eNB #10 generates the transmission power control signal for controlling the transmission power of the uplink signal at the mobile station UE, based on the reception quality of a data signal (an uplink signal) obtained by the synthesis.

In step S2006, the radio base station eNB #10 transmits the transmission power control signal, to the radio base station RRE #1.

In step S2007, the radio base station RRE #1 transmits the transmission power control signal to the mobile station UE. In step S2008, the mobile station UE controls the transmission power of the uplink signal, based on the received transmission power control signal.

Secondly, a second exemplary operation of the mobile communication system according to the first modification will be described with reference to FIG. 8. In the example of FIG. 8, it is assumed that the mobile station UE establishes a radio link with the cell #2 under the control of the radio base station eNB #2 in the autonomous distributed control network and with the cell #11 under the control of the radio base station RRE#1 in the centralized control network.

As shown in FIG. 8, in step S3001, the mobile station UE transmits a data signal as an uplink signal.

In step S3002, the radio base station RRE #1 transfers the data signal from the mobile station UE received in the cell #11, to the radio base station eNB #10.

In step S3003, the radio base station eNB #2 generates a transmission power control signal for controlling the transmission power of the uplink signal at the mobile station UE, based on the reception quality of the data signal (the uplink signal) from the mobile station UE received in the cell #2. In step S3004, the radio base station eNB #2 transmits the transmission power control signal to the mobile station UE.

On the other hand, in step S3005, the radio base station eNB #10 generates the transmission power control signal for controlling the transmission power of the uplink signal at the mobile station UE, based on the reception quality of the data signal (the uplink signal) transferred from the radio base station RRE #1. In step S3006, the radio base station eNB #10 transmits the transmission power control signal to the mobile station UE through the radio base station RRE #1.

In step S3007, the mobile station UE controls the transmission power of the uplink signal, based on the transmission power control signal received from the radio base station eNB #2 and the transmission power control signal received from the radio base station RRE #1.

For example, the mobile station UE may raise the transmission power of the uplink signal only when both the transmission power control signal received from the radio base station eNB #2 and the transmission power control signal received from the radio base station RRE #1 are requested to raise the transmission power of the uplink signal. In other cases, the mobile station UE may lower the transmission power of the uplink signal.

According to the embodiment-based mobile communication system, it is possible to flexibly change the method of controlling the transmission power of an uplink signal at a mobile station UE according to the types of cells in which the mobile station UE establishes a radio link, in an environment in which an autonomous distributed control network and a centralized control network are mixed.

The operation of the above-described mobile station UE, the radio base station eNB or the radio base station RRE may be implemented by a hardware, may also be implemented by a software module executed by a processor, and may further be implemented by the combination of the both.

The software module may be arranged in a storing medium of an arbitrary format such as RAM (Random Access Memory), a flash memory, ROM (Read Only Memory), EPROM (Erasable Programmable ROM), EEPROM (Electronically Erasable and Programmable ROM), a register, a hard disk, a removable disk, and CD-ROM.

Such a storing medium is connected to the processor so that the processor can write and read information into and from the storing medium. Such a storing medium may also be accumulated in the processor. Such a storing medium and processor may be arranged in ASIC. Such ASIC may be arranged in the mobile station UE, the radio base station eNB or the radio base station RRE. As a discrete component, such a storing medium and processor may be arranged in the mobile station UE, the radio base station eNB or the radio base station RRE.

Thus, the present invention has been explained in detail by using the above-described embodiments; however, it is obvious that for persons skilled in the art, the present invention is not limited to the embodiments explained herein. The present invention can be implemented as a corrected, modified mode without departing from the gist and the scope of the present invention defined by the claims. Therefore, the description of the specification is intended for explaining the example only and does not impose any limited meaning to the present invention.

The invention claimed is:

1. A transmission power control method of controlling transmission power of an uplink signal at a mobile station setting a radio link with a first cell under the control of a first radio base station and with a second cell under the control of a second radio base station, the method comprising the steps of:
   (A) transferring, from the second radio base station to the first radio base station, a second uplink signal received from the mobile station in the second cell;
   (B) synthesizing, at the first radio base station, a first uplink signal received from the mobile station in the first cell with the second uplink signal transferred from the second radio base station, generating and transmitting a transmission power control signal for controlling the transmission power of the uplink signal at the mobile station based on a reception quality of an uplink signal obtained by synthesizing the first uplink signal with the second uplink signal; and
   (C) controlling, at the mobile station, the transmission power of the uplink signal based on the received transmission power control signal.

2. The transmission power control method according to claim 1, wherein
   in the step (A), the second radio base station transfers, to the first radio base station, the second uplink signal as a signal of a layer 1; and
   in the step (B), the first radio base station synthesizes the first uplink signal with the second uplink signal by a maximum ratio combining.

3. The transmission power control method according to claim 1, wherein
   in the step (A), the second radio base station transfers, to the first radio base station, the second uplink signal as a signal of a layer 2 or a signal of a layer 3; and
   in the step (B), the first radio base station synthesizes the first uplink signal with the second uplink signal by a selection combining.

4. A mobile communication system configured to control transmission power of an uplink signal at a mobile station setting a radio link with a first cell under the control of a first radio base station and with a second cell under the control of a second radio base station; wherein
   the second radio base station is configured to transfer, to the first radio base station, a second uplink signal received from the mobile station in the second cell;
   the first radio base station is configured to synthesize a first uplink signal received from the mobile station in the first cell with the second uplink signal transferred from the second radio base station, and to generate and transmit a transmission power control signal for controlling the transmission power of the uplink signal at the mobile station based on a reception quality of an uplink signal obtained by synthesizing the first uplink signal with the second uplink signal; and
   the mobile station is configured to control the transmission power of the uplink signal based on the received transmission power control signal.

5. The mobile communication system according to claim 4, wherein
   the second radio base station is configured to transfer, to the first radio base station, the second uplink signal as a signal of a layer 1; and
   the first radio base station is configured to synthesize the first uplink signal with the second uplink signal by a maximum ratio combining.

6. The mobile communication system according to claim 4, wherein
   the second radio base station is configured to transfer, to the first radio base station, the second uplink signal as a signal of a layer 2 or a signal of a layer 3; and
   the first radio base station is configured to synthesize the first uplink signal with the second uplink signal by a selection combining.

7. A radio base station serving as a first radio station in a mobile communication system configured to control transmission power of an uplink signal at a mobile station setting a radio link with a first cell under the control of the first radio base station and with a second e cell under the control of a second radio base station, the radio base station comprising:
   a synthesis unit configured to synthesize a first uplink signal received from the mobile station in the first cell with a second uplink signal transferred from the second radio base station and received from the mobile station in the second cell; and
   a transmission unit configured to generate and transmit a transmission power control signal for controlling the transmission power of the uplink signal at the mobile station based on a reception quality of an uplink signal obtained by synthesizing the first uplink signal with the second uplink signal.

8. The radio base station according to claim 7, wherein the synthesis unit is configured to synthesize the first uplink signal with the second uplink signal by a maximum ratio combining, when the second uplink signal is received from the second radio base station as a signal of a layer 1.

9. The radio base station according to claim 7, wherein the synthesis unit is configured to synthesize the first uplink signal with the second uplink signal by a selection combining, when the second uplink signal is received from the second radio base station as a signal of a layer 2 or a signal of a layer 3.

* * * * *